460-78 SR ɔc. available. Dr
M7843 OR X 3,826 ΓUTED FOR MISSING COPY
BEST AVAILABLE COPY
E. WARREN.
MACHINE FOR THRESHING GRAIN AND WINNOWING AND CUTTING STRAW.
Patented Mar. 6, 1824.
3826-X
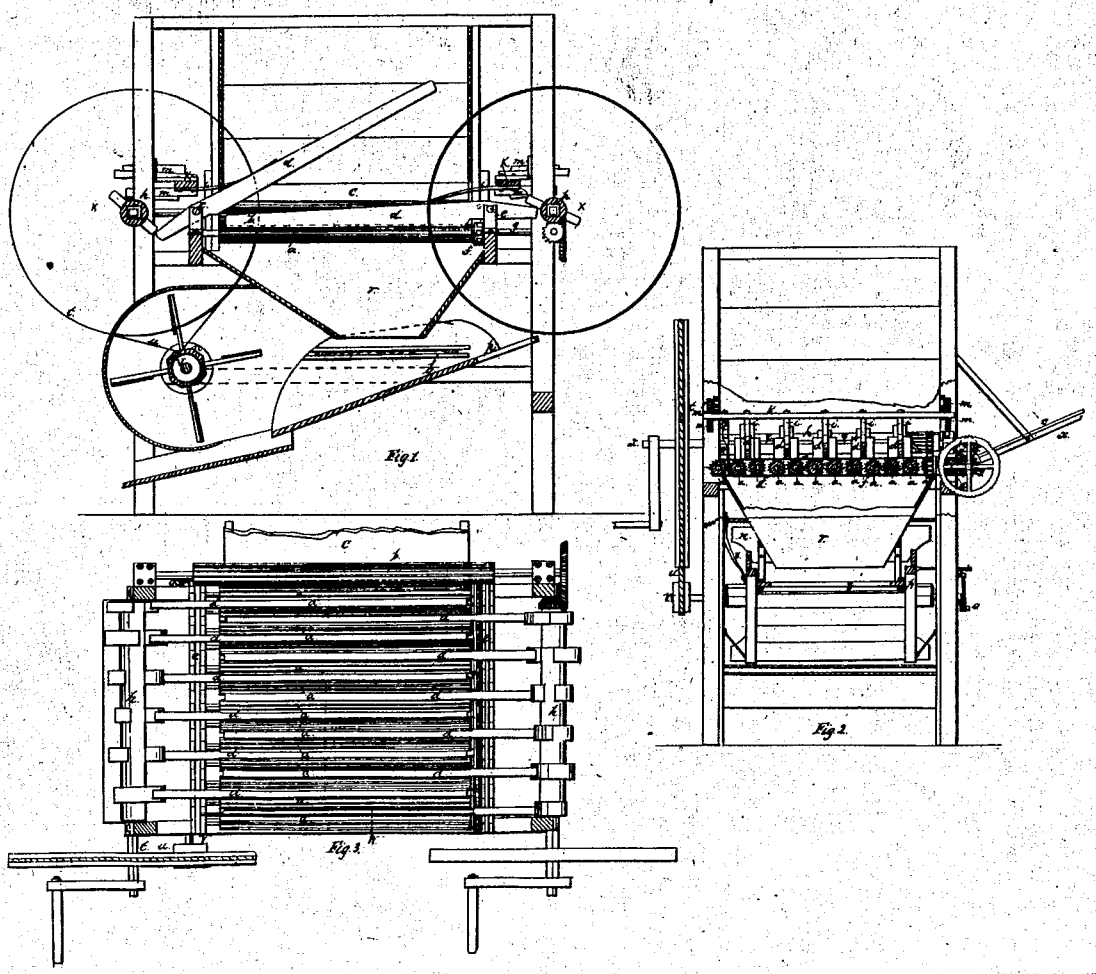

United States Patent Office

PTO - BOYERS, PA Duty Station

MISSING PAGE TEMPORARY NOTICE

PATENT # X3826 FOR ISSUE DATE 3-6-1824

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text bo 1-10-94

Data Conversion Operation

Boyers, Pa